United States Patent
Hu

(10) Patent No.: US 12,177,464 B2
(45) Date of Patent: Dec. 24, 2024

(54) VIDEO ENCODING METHOD AND APPARATUS, VIDEO DECODING METHOD AND APPARATUS, COMPUTER-READABLE MEDIUM, AND ELECTRONIC DEVICE

(71) Applicant: TENCENT TECHNOLOGY (SHENZHEN) COMPANY LIMITED, Shenzhen (CN)

(72) Inventor: Ye Hu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 212 days.

(21) Appl. No.: 17/989,400

(22) Filed: Nov. 17, 2022

(65) Prior Publication Data
US 2023/0082386 A1    Mar. 16, 2023

Related U.S. Application Data

(63) Continuation of application No. PCT/CN2021/131610, filed on Nov. 19, 2021.

(30) Foreign Application Priority Data

Feb. 21, 2021   (CN) .......................... 202110194838.9

(51) Int. Cl.
*H04N 11/02*  (2006.01)
*H04N 19/119*  (2014.01)
(Continued)

(52) U.S. Cl.
CPC .......... *H04N 19/44* (2014.11); *H04N 19/119* (2014.11); *H04N 19/176* (2014.11); *H04N 19/46* (2014.11)

(58) Field of Classification Search
CPC ...................................................... H04N 19/44
(Continued)

(56) References Cited

U.S. PATENT DOCUMENTS 8,526,495 B2   9/2013   Liu et al.
9,049,452 B2   6/2015   Liu et al.
(Continued)

FOREIGN PATENT DOCUMENTS

CN   103124349 A   5/2013
CN   109788285 A   5/2019
(Continued)

OTHER PUBLICATIONS

The State Intellectual Property Office of the People's Republic of China (SIPO) Office Action 1 for 202110194838.9 Apr. 26, 2024 13 Pages (including translation).

(Continued)

*Primary Examiner* — Leron Beck
(74) *Attorney, Agent, or Firm* — ANOVALAW GROUP PLLC

(57) ABSTRACT

A video decoding method includes: segmenting to-be-decoded coefficients according to a scan order of a scan region-based coefficient coding (SRCC) scan region in a coding block of a video image frame to obtain one or more coefficient parts each including a plurality of coefficients; decoding a coefficient part all zero flag of each of the coefficient parts to obtain a value of the coefficient part all zero flag; decoding a significant flag of each coefficient in the coefficient part according to the scan order in response to the value of the coefficient part all zero flag being a preset first value, the significant flag being used for indicating whether the coefficient is a non-zero coefficient; and setting the significant flag of each coefficient in the coefficient part (Continued)

to zero, in response to the value of the coefficient part all zero flag being a preset second value.

20 Claims, 10 Drawing Sheets

(51) Int. Cl.
*H04N 19/176* (2014.01)
*H04N 19/44* (2014.01)
*H04N 19/46* (2014.01)

(58) Field of Classification Search
USPC .......................................... 375/240.01–240.2
See application file for complete search history.

(56) References Cited

U.S. PATENT DOCUMENTS

| | | | |
|---|---|---|---|
| 10,455,231 B2 | 10/2019 | Xu et al. | |
| 10,587,881 B2 | 3/2020 | Xu et al. | |
| 10,587,885 B2 | 3/2020 | Ye et al. | |
| 10,666,968 B2 | 5/2020 | Xu et al. | |
| 2007/0237235 A1* | 10/2007 | Krishnan | H04N 19/18 375/240.18 |
| 2013/0107969 A1 | 5/2013 | Nguyen et al. | |
| 2013/0128985 A1 | 5/2013 | He et al. | |
| 2013/0188724 A1* | 7/2013 | Nguyen | H04N 19/176 375/240.18 |
| 2013/0215969 A1 | 8/2013 | Fang et al. | |
| 2016/0366432 A1* | 12/2016 | Nguyen | H04N 19/18 |
| 2017/0094271 A1 | 3/2017 | Liu et al. | |
| 2021/0021831 A1 | 1/2021 | Chen et al. | |
| 2022/0078425 A1 | 3/2022 | Wang et al. | |
| 2022/0094987 A1* | 3/2022 | Zhang | H04N 19/159 |
| 2022/0150501 A1* | 5/2022 | Leleannec | H04N 19/42 |

FOREIGN PATENT DOCUMENTS

| | | |
|---|---|---|
| CN | 110708552 A | 1/2020 |
| CN | 112106365 A | 12/2020 |
| WO | 2018159526 A1 | 9/2018 |

OTHER PUBLICATIONS

The World Intellectual Property Organization (WIPO) International Search Report for PCT/CN2021/131610 Feb. 23, 2022 8 Pages (including translation).
G. J. Sullivan et al., "Overview of the high efficiency video coding (HEVC) standard." 2012, IEEE Trans. Circuits Syst. Video Technol.
Benjamin Bross et al., "Versatile Video Coding (Draft 2)", Jul. 10-18, 2018,ISO/IEC JTC1/SC29/WG11 JVET-K1001.
Benjamin Bross et al., "General Video Coding Technology in Responses to the Joint Call for Proposals on Video Compression with Capability beyond HEVC", 2019, IEEE Transactions on Circuits and Systems for Video Technology.
Rajan Joshi et al. "High Efficiency Video Coding (HEVC) Screen Content Coding: Draft 4", Jun. 19-26, 2015 , ISO/IEC JTC1/SC29/WG11 JCTVC-U1005. Part 1.
Rajan Joshi et al. "High Efficiency Video Coding (HEVC) Screen Content Coding: Draft 4", Jun. 19-26, 2015 , ISO/IEC JTC1/SC29/WG11 JCTVC-U1005. Part 2.
Rajan Joshi et al. "High Efficiency Video Coding (HEVC) Screen Content Coding: Draft 4", Jun. 19-26, 2015 , ISO/IEC JTC1/SC29/WG11 JCTVC-U1005. Part 3.
Shan Liu et al. "Overview of HEVC extensions on screen content coding", vol. 4. 2015, Cambridge University Press.
Rajan Joshi et al. "Screen content coding test model 1 (SCM 1)", JCTVC-Q1014, Valencia, Spain.
Shan Liu et al. "Hybrid global-local motion compensated frame interpolation for low bit rate video coding", p. 58-76, Journal of Visual Communication and Image Representation 14 (1).
Shan Liu et al. "Nonlinear motion-compensated interpolation for low-bit-rate video", Applications of Digital Image Processing XXIII 4115, 203-213.
"AVS3-Part2: Video (Draft)", AVS Work Group, Mar. 2020, China.

* cited by examiner

VIDEO ENCODING METHOD AND APPARATUS, VIDEO DECODING METHOD AND APPARATUS, COMPUTER-READABLE MEDIUM, AND ELECTRONIC DEVICE

RELATED APPLICATION(S)

This application is a continuation application of PCT Patent Application No. PCT/CN2021/131610 filed on Nov. 19, 2021, which claims priority to Chinese Patent Application No. 202110194838.9, entitled "VIDEO ENCODING METHOD AND APPARATUS, VIDEO DECODING METHOD AND APPARATUS, COMPUTER-READABLE MEDIUM, AND ELECTRONIC DEVICE" and filed with the China National Intellectual Property Administration on Feb. 21, 2021, all of which are incorporated herein by reference in its entirety.

FIELD OF THE TECHNOLOGY

The present disclosure relates to the field of computer technologies, and in particular, to a video encoding method and apparatus, a video decoding method and apparatus, a computer-readable medium, and an electronic device.

BACKGROUND

In the video encoding process, the encoder side generally performs transformation, quantization, and entropy coding on residual data between original video data and predicted video data and transmit the processed residual data to the decoder side. Due to the relatively sparse numerical distributions of residual data, during encoding and decoding of residual data, a flag indicating whether each coefficient is a zero coefficient may be encoded and decoded, resulting in unwanted encoding redundancy and low coding efficiency and affecting the video compression performance.

SUMMARY

An objective of the present disclosure is to provide a video encoding method and apparatus, a video decoding method and apparatus, a computer-readable medium, and an electronic device, to overcome the technical problem of low video encoding and decoding efficiency in certain existing art.

In one aspect, the present disclosure provides a video decoding method, performed by an electronic device, the method including: segmenting to-be-decoded coefficients according to a scan order of a scan region-based coefficient coding (SRCC) scan region in a coding block of a video image frame to obtain one or more coefficient parts each including a plurality of coefficients; decoding a coefficient part all zero flag of each of the coefficient parts to obtain a value of the coefficient part all zero flag, the coefficient part all zero flag being used for indicating whether all coefficients in the coefficient part are zero; decoding a significant flag of each coefficient in the coefficient part according to the scan order in response to the value of the coefficient part all zero flag being a preset first value, the significant flag being used for indicating whether the coefficient is a non-zero coefficient; and setting the significant flag of each coefficient in the coefficient part to zero, in response to the value of the coefficient part all zero flag being a preset second value.

In another aspect, the present disclosure provides a video encoding method, performed by an electronic device, the method including: segmenting to-be-encoded coefficients according to a scan order of a scan region-based coefficient coding (SRCC) scan region in a coding block of a video image frame to obtain one or more coefficient parts each including a plurality of coefficients; determining a value of a coefficient part all zero flag of each of the coefficient parts according to whether all coefficients in the coefficient part are zero, and encoding the coefficient part all zero flag; encoding a significant flag of each coefficient in the coefficient part according to the scan order in response to the value of the coefficient part all zero flag being a preset first value, the significant flag being used for indicating whether the coefficient is a non-zero coefficient; and skipping encoding the significant flag of each coefficient in the coefficient part in response to the value of the coefficient part all zero flag being a preset second value.

In yet another aspect, the present disclosure provides a video decoding apparatus, the apparatus including: a memory storing computer program instructions; and a processor coupled to the memory and configured to execute the computer program instructions and perform: segmenting to-be-decoded coefficients according to a scan order of a scan region-based coefficient coding (SRCC) scan region in a coding block of a video image frame to obtain one or more coefficient parts; decoding a coefficient part all zero flag of each of the coefficient parts to obtain a value of the coefficient part all zero flag, the coefficient part all zero flag being used for indicating whether all coefficients in the coefficient part are zero; decoding a significant flag of each coefficient in the coefficient part according to the scan order in response to the value of the coefficient part all zero flag being a preset first value, the significant flag being used for indicating whether the coefficient is a non-zero coefficient; and skipping decoding the significant flag and setting the significant flag of each coefficient in the coefficient part to zero, in response to the value of the coefficient part all zero flag being a preset second value.

In yet another aspect, the present disclosure provides a video encoding apparatus, the apparatus including: a memory storing computer program instructions; and a processor coupled to the memory and configured to execute the computer program instructions and perform: segmenting to-be-encoded coefficients according to a scan order of a scan region-based coefficient coding (SRCC) scan region in a coding block of a video image frame to obtain one or more coefficient parts each including a plurality of coefficients; determining a value of a coefficient part all zero flag of each of the coefficient parts according to whether all coefficients in the coefficient part are zero, and encoding the coefficient part all zero flag; encoding a significant flag of each coefficient in the coefficient part according to the scan order in response to the value of the coefficient part all zero flag being a preset first value, the significant flag being used for indicating whether the coefficient is a non-zero coefficient; and skipping encoding the significant flag of each coefficient in the coefficient part in response to the value of the coefficient part all zero flag being a preset second value.

In yet another aspect, the present disclosure provides a non-transitory computer-readable storage medium storing computer program instructions executable by at least one processor to perform: segmenting to-be-decoded coefficients according to a scan order of a scan region-based coefficient coding (SRCC) scan region in a coding block of a video image frame to obtain one or more coefficient parts; decoding a coefficient part all zero flag of each of the coefficient parts to obtain a value of the coefficient part all zero flag, the coefficient part all zero flag being used for indicating whether all coefficients in the coefficient part are zero;

decoding a significant flag of each coefficient in the coefficient part according to the scan order in response to the value of the coefficient part all zero flag being a preset first value, the significant flag being used for indicating whether the coefficient is a non-zero coefficient; and skipping decoding the significant flag and setting the significant flag of each coefficient in the coefficient part to zero, in response to the value of the coefficient part all zero flag being a preset second value.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

When and as applicable, the term "an embodiment," "one embodiment," "some embodiment(s), "some embodiments," "certain embodiment(s)," or "certain embodiments" may refer to one or more subsets of all possible embodiments. When and as applicable, the term "an embodiment," "one embodiment," "some embodiment(s), "some embodiments," "certain embodiment(s)," or "certain embodiments" may refer to the same subset or different subsets of all the possible embodiments, and can be combined with each other without conflict.

In certain embodiments, the term "based on" is employed herein interchangeably with the term "according to."

The described features, structures, or characteristics may be combined in one or more embodiments in any appropriate manner. In the following descriptions, a lot of specific details are provided to give a comprehensive understanding of the embodiments of the present disclosure. However, a person skilled in the art is to be aware that, the technical solutions in the present disclosure may be implemented without one or more of the particular details, or another method, unit, apparatus, or step may be used. Well-known methods, apparatuses, implementations, or operations are not shown or described in detail, to avoid obscuring the aspects of the present disclosure.

The block diagrams shown in the accompanying drawings are merely functional entities and do not necessarily correspond to physically independent entities. That is, the functional entities may be implemented in a software form, or in one or more hardware modules or integrated circuits, or in different networks and/or processor apparatuses and/or microcontroller apparatuses.

The flowcharts shown in the accompanying drawings are merely exemplary descriptions and do not necessarily include all of the content and operations/steps, nor are the flowcharts necessarily performed in the order described. For example, some operations/steps may be further divided, while some operations/steps may be combined or partially combined. Therefore, an actual execution order may change.

A "plurality of" mentioned herein means two or more. The term "and/or" describes an association relationship for describing associated objects and represents that three relationships may exist. For example, A and/or B may represent the following three scenarios: Only A exists, both A and B exist, and only B exists. The character "/" generally indicates an "or" relationship between the associated objects.

Figure 1:
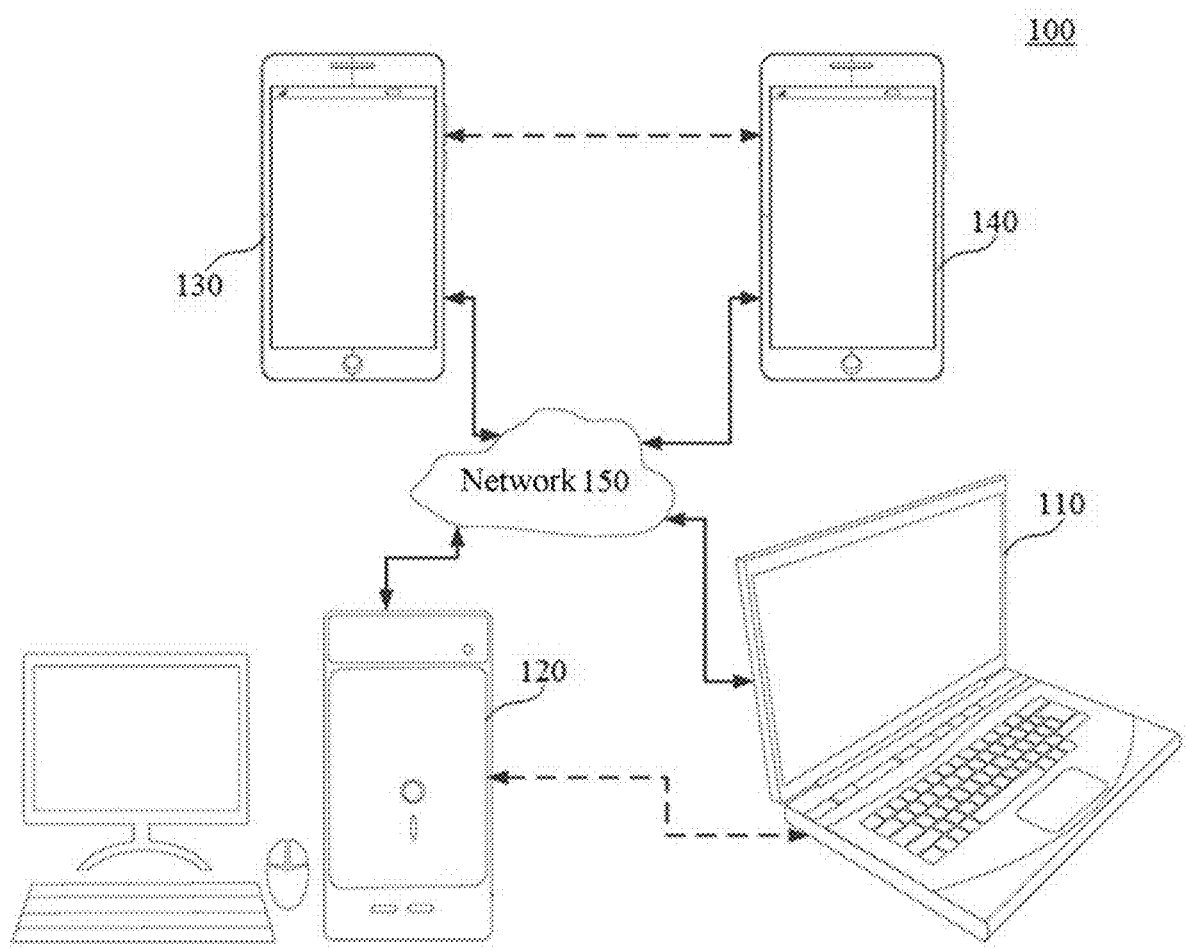
FIG. 1 is a schematic diagram of a system architecture according to certain embodiment(s) of the present disclosure.

FIG. 1 is a schematic diagram of an exemplary system architecture to which a technical solution in an embodiment of the present disclosure is applicable.

As shown in FIG. 1, a system architecture 100 includes a plurality of terminal apparatuses. The terminal apparatuses can communicate with each other through a network 150, for example. For example, the system architecture 100 may include a first terminal apparatus 110 and a second terminal apparatus 120 connected through the network 150. In the embodiment of FIG. 1, the first terminal apparatus 110 and the second terminal apparatus 120 perform unidirectional data transmission.

For example, the first terminal apparatus 110 may code video data (for example, a video picture stream captured by the first terminal apparatus 110) and transmit the coded video data to the second terminal apparatus 120 through the network 150. The coded video data is transmitted in a form of one or more coded video bit streams. The second terminal apparatus 120 may receive the coded video data through the network 150, decode the coded video data to recover the video data, and display a video picture according to the recovered video data.

In an embodiment of the present disclosure, the system architecture 100 may include a third terminal apparatus 130 and a fourth terminal apparatus 140 that perform bidirectional transmission of the coded video data. The bidirectional transmission may be performed, for example, during a video conference. During the bidirectional data transmission, one of the third terminal apparatus 130 and the fourth terminal apparatus 140 may code video data (for example, a video picture stream captured by the terminal apparatus) and transmit the coded video data to the other of the third terminal apparatus 130 and the fourth terminal apparatus 140 through the network 150. One of the third terminal apparatus 130 and the fourth terminal apparatus 140 may further receive coded video data transmitted by the other of the third terminal apparatus 130 and the fourth terminal apparatus 140, and may decode the coded video data to recover the video data and may display a video picture on an accessible display apparatus according to the recovered video data.

In the embodiment of FIG. 1, the first terminal apparatus 110, the second terminal apparatus 120, the third terminal apparatus 130, and the fourth terminal apparatus 140 may be servers, personal computers, or smart phones, but the principle disclosed in the present disclosure may not be limited thereto. The embodiments disclosed in the present disclosure are applicable to laptop computers, tablet computers, media players, and/or dedicated video conferencing devices. The network 150 represents any number of networks through which coded video data is transmitted among the first terminal apparatus 110, the second terminal apparatus 120, the third terminal apparatus 130, and the fourth terminal apparatus 140, for example, including a wired and/or wireless communication network. The communication network 150 may exchange data in a circuit switching channel and/or a packet switching channel. The network may include a telecommunication network, a local area network, a wide area network, and/or the Internet. For the purpose of the present disclosure, unless explained below, an architecture and a topology of the network 150 may be inessential to the operation disclosed in the present disclosure.

Figure 2:
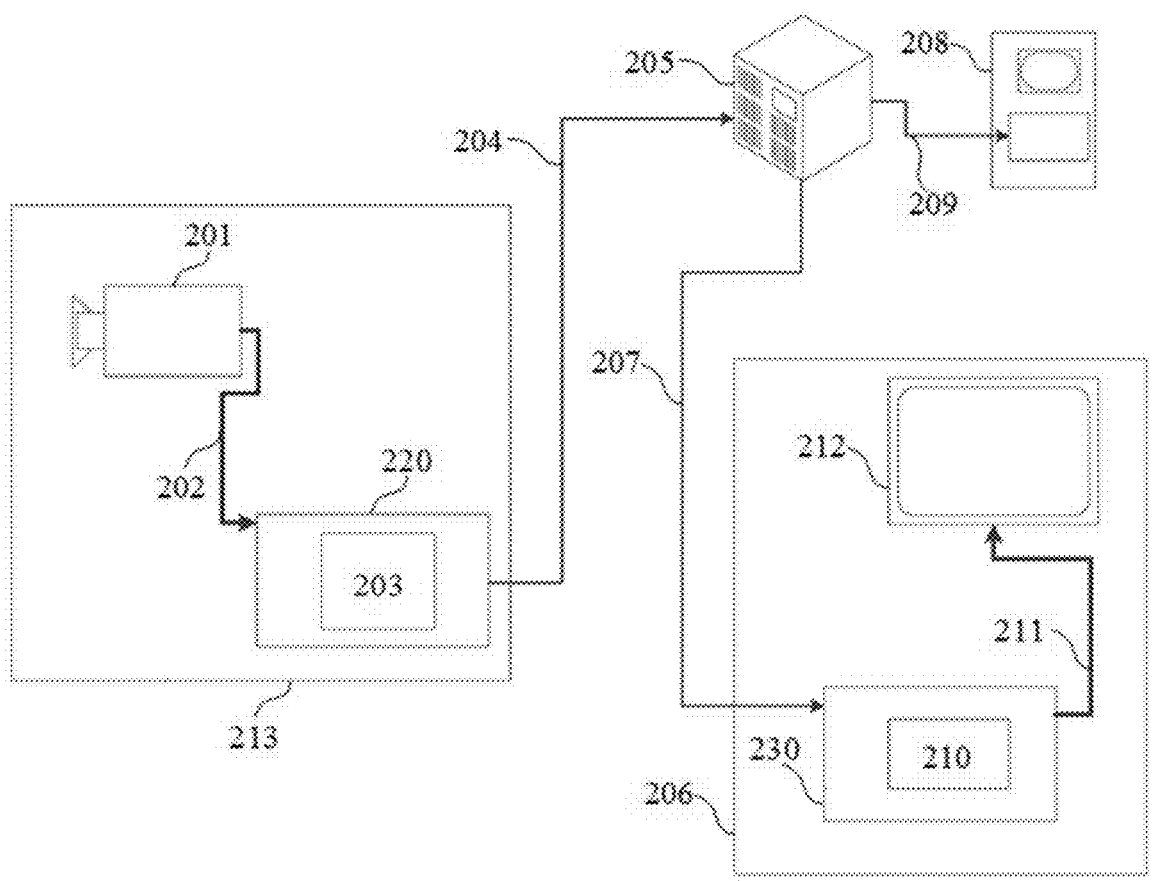
FIG. 2 is a schematic diagram of a placement manner of a video encoding apparatus and a video decoding apparatus in a streaming transmission system.

In an embodiment of the present disclosure, FIG. 2 shows a placement manner of a video encoding apparatus and a video decoding apparatus in a streaming transmission environment. The subject disclosed in the present disclosure may be comparably applicable to other video-enabled applications, including, for example, a video conference, a digital television (TV), and storage of compressed videos on digital media including a CD, a DVD, and a memory stick.

A streaming transmission system may include a capture subsystem 213. The capture subsystem 213 may include a video source 201 such as a digital camera. The video source creates an uncompressed video picture stream 202. In an embodiment, the video picture stream 202 includes a sample captured by the digital camera. Compared with the coded video data 204 (or a coded video bit stream 204), the video picture stream 202 is depicted by a thick line to emphasize the video picture stream with a large data volume. The video picture stream 202 may be processed by an electronic device 220. The electronic device 220 includes a video encoding apparatus 203 coupled to the video source 201. The video encoding apparatus 203 may include hardware, software, or a combination of hardware and software to realize or implement various aspects of the disclosed subject matter described in more detail below. Compared with the video picture stream 202, the coded video data 204 (or a coded video bit stream 204) is depicted by a thin line to emphasize the coded video data 204 with a small data volume (or a coded video bit stream 204), which may be stored on a streaming transmission server 205 for future use. One or more streaming transmission client subsystems, for example, a client subsystem 206 and a client subsystem 208 in FIG. 2, may access the streaming transmission server 205 to retrieve a copy 207 and a copy 209 of the coded video data 204. The client subsystem 206 may include, for example, a video decoding apparatus 210 in an electronic device 230. The video decoding apparatus 210 decodes an incoming copy 207 of the coded video data and generates an output video picture stream 211 that can be presented on a display 212 (such as a display screen) or an other presence apparatus. In some streaming transmission systems, the coded video data 204, the video data 207, and the video data 209 (for example, the video bit stream) may be coded according to some video coding/compression standards. Embodiments of the standards include ITU-T H.265. In an embodiment, a video coding standard under development is informally referred to as versatile video coding (VVC). The present disclosure may be used in the context of the VVC standard.

The electronic device 220 and the electronic device 230 may include other components not shown in the figure. For example, the electronic device 220 may include a video decoding apparatus, and the electronic device 230 may further include a video encoding apparatus.

In an embodiment of the present disclosure, international video coding standards such as High Efficiency Video Coding (HEVC) and the VVC and the Chinese national video coding standard such as the Audio Video coding Standard (AVS) are used as examples. When a video image frame is inputted, the video image frame is partitioned into a plurality of non-overlapping processing units according to a block size, and a similar compression operation is performed on each processing unit. The processing unit is referred to as a coding tree unit (CTU) or a largest coding unit (LCU). The CTU may be further partitioned more finely to obtain one or more basic coding units (CU). The CU is the most basic element in a coding process. Some concepts during coding of the CU are described below.

Predictive coding: The predictive coding includes modes such as intra prediction and inter prediction. After an original video signal is predicted by using a selected reconstructed video signal, a residual video signal is obtained. An encoder side is desired to select a predictive coding mode for a current CU and inform a decoder side. The intra prediction means that a predicted signal comes from a region that has been coded and reconstructed in a same image. The inter prediction means that the predicted signal comes from a coded image (referred to as a reference image) that is different from a current image.

Transform and Quantization: Transform operations such as Discrete Fourier Transform (DFT) and Discrete Cosine Transform (DCT) are performed on a residual video signal to convert the signal into a transform domain, which is referred to as a transform coefficient. A lossy quantization operation is further performed on the transform coefficient, which loses a specific amount of information, so that the quantized signal facilitates compressed expression. In some video coding standards, more than one transform mode may be selected. Therefore, the encoder side is also desired to select one transform mode for the current CU and inform the decoder side. Fineness of the quantization is generally determined by a quantization parameter (QP). A larger QP indicates that coefficients with a larger value range are to be quantized into a same output, which usually brings greater distortion and a lower bit rate. On the contrary, a smaller QP indicates that coefficients within a smaller value range are to be quantized into a same output, which generally brings less distortion and a higher bit rate.

Entropy coding or statistical coding: Statistical compression coding is performed on the quantized signal in the transform domain according to a frequency of occurrence of each value, and finally a binarized (0 or 1) compressed bit stream is outputted. In addition, entropy coding is also desired to be performed on other information generated during the coding, such as the selected coding mode and motion vector data, to reduce a bit rate. Statistical coding is a lossless coding manner that can effectively reduce a bit rate desired for expressing a same signal. A common statistical coding mode includes variable length coding (VLC for short) or context adaptive binary arithmetic coding (CABAC for short).

A context adaptive binary arithmetic coding (CABAC) process includes three steps: binarization, context modeling, and binary arithmetic coding. After binarization of inputted syntax elements, the binary data may be encoded by a conventional encoding mode and a bypass coding mode. The bypass coding mode does not desire the assignment of a specific probability model to each binary bit, and an inputted binary bit bin value is directly encoded using a simple bypass encoder to speed up the entire encoding and decoding process. In general, different syntax elements are not completely independent, and the same syntax elements themselves have a certain memory. Thus, according to the conditional entropy theory, using other coded syntax elements for conditional coding can further improve the coding performance compared with independent coding or memoryless coding. Encoded symbolic information that is used as a condition is referred to as a context. In the conventional coding mode, binary bits of a syntax element sequentially enter a context modeler. The encoder allocates a suitable probability model for each inputted binary bit based on a value of a previously encoded syntax element or binary bit. This process is referred to as context modeling. A context model corresponding to a syntax element can be located via ctxIdxInc (context index increment) and ctxIdxStart (context index start). After feeding the bin value and the allocated probability model together into the binary arithmetic encoder for encoding, the context model may be updated according to the bin value, which is the adaptive process in the encoding.

Loop filtering: Operations such as inverse quantization, inverse transform, and predictive compensation are performed on a transformed and quantized signal to obtain a reconstructed image. The reconstructed image has some information different from that in an original image as a result of quantization, that is, the reconstructed image may cause distortion. Therefore, a filtering operation may be performed on the reconstructed image, for example, by using filters such as a deblocking filter (DB), a sample adaptive offset (SAO) filter, or an adaptive loop filter (ALF), which can effectively reduce a degree of distortion caused by quantization. Since the filtered reconstructed images are to be used as a reference for subsequently coded images to predict future image signals, the filtering operation is also referred to as loop filtering, that is, a filtering operation in a coding loop.

Figure 3:
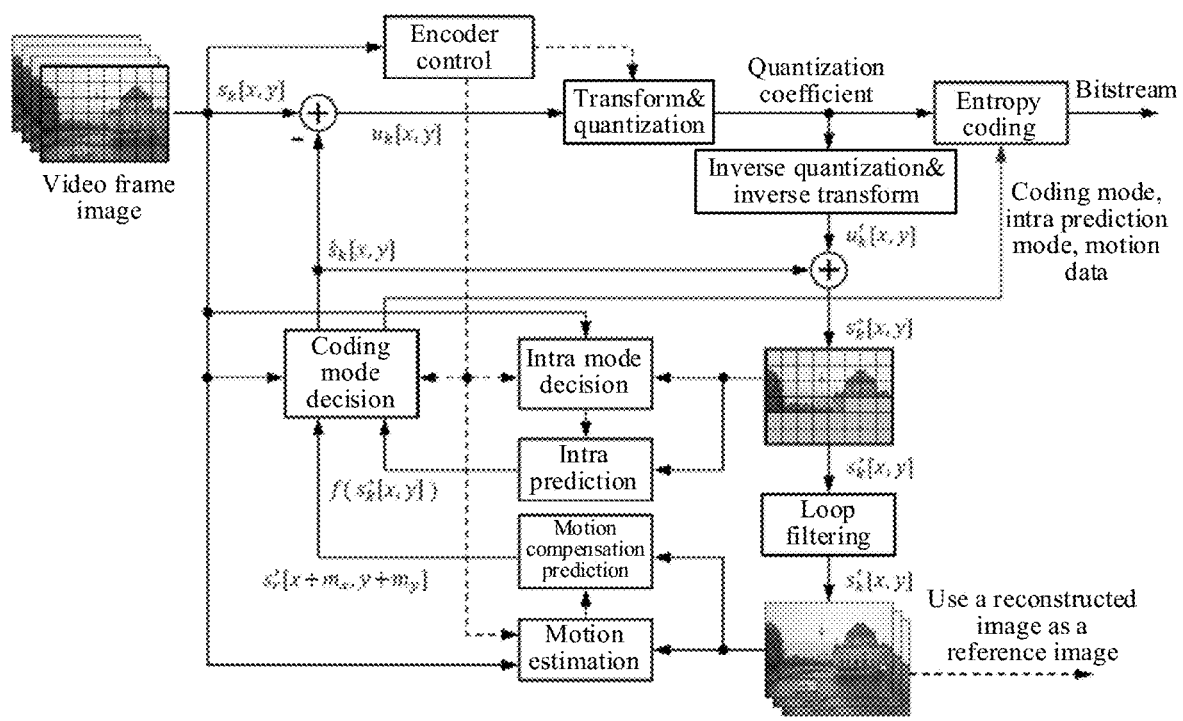
FIG. 3 is a schematic flowchart of a video encoder.

In an embodiment of the present disclosure, FIG. 3 is a basic flowchart of a video encoder. In this process, intra prediction is used as an example for description. A difference between an original image signal $s_k[x, y]$ and a predicted image signal $\hat{s}_k[x, y]$ is calculated to obtain a residual signal $u_k[x, y]$, and the residual signal $u_k[x, y]$ is transformed and quantized to obtain a quantization coefficient. The quantization coefficient is subjected to entropy coding to obtain a coded bit stream, and is further subjected to inverse quantization and inverse transform to obtain a reconstructed residual signal $u'_k[x, y]$. The predicted image signal $\hat{s}_k[x, y]$ is superimposed with the reconstructed residual signal $u'_k[x, y]$ to generate an image signal $s^*_k[x, y]$. The image signal $s^*_k[x, y]$ is inputted to an intra mode decision module and an intra prediction module for intra prediction, and is further subjected to loop filtering to output a reconstructed image signal $s'_k[x, y]$. The reconstructed image signal $s'_k[x, y]$ may be used as a reference image for a next frame for motion estimation and motion compensation prediction. A predicted image signal $\hat{s}_k[x, y]$ of the next frame is obtained based on a result $s'_r[x+m_x, y+m_y]$ of the motion compensation prediction and a result $f(s^*_k[x, y])$ of the intra prediction. The above process is repeated until the encoding is completed.

Based on the coding process, on the decoder side, for each CU, after a compressed bit stream is acquired, entropy decoding is performed to obtain various mode information and quantization coefficients. Inverse quantization and inverse transform are performed on the quantization coefficients to obtain a residual signal. Moreover, a predicted signal corresponding to the CU can be obtained according to coding mode information that is known. The residual signal may be added to the predicted signal to obtain a reconstructed signal. The reconstructed signal is subjected to operations such as loop filtering to generate a final output signal.

During the above coding and decoding, the transform processing performed on the residual signal causes energy of the residual signal to concentrate on few low-frequency coefficients, that is, most coefficients have relatively small values. After being processing by a subsequent quantization module, the relatively small coefficient values become zero, which greatly reduces costs of coding the residual signal. However, due to diversified residual distribution, the DCT cannot adapt to all residual characteristics. Therefore, transform kernels such as DST7 and DCT8 are applied to the transform process, and horizontal transform and vertical transform of the residual signal can be performed by using different transform kernels. An adaptive multiple core transform (AMT) technology is used as an example. Possible transform combinations for transform processing of the residual signal include (DCT2, DCT2), (DCT8, DCT8), (DCT8, DST7), (DST7, DCT8), and (DST7, DST7). For one residual signal, a specific transform combination to be selected may be decided at the encoder side by using Rate-Distortion Optimization (RDO). In addition, when or in response to determining that the residual distribution correlation within the residual block is weak, the residual signal may be directly quantified without being transformed, that is, the transformation is skipped. Whether the current residual block belongs to the transform skip mode may be explicitly encoded or implicitly exported.

Figure 4:
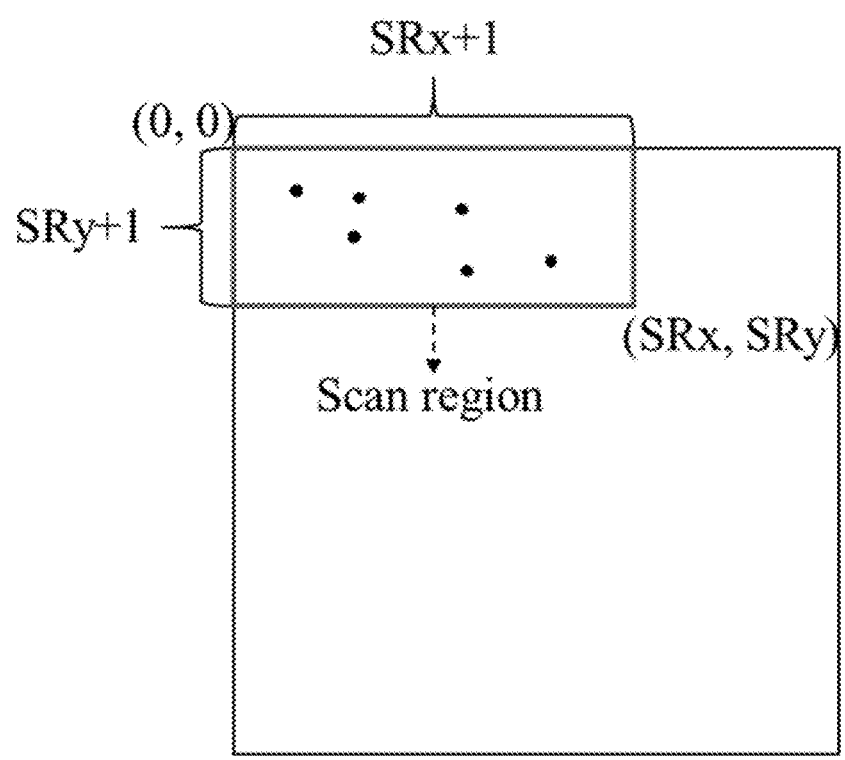
FIG. 4 is a schematic scan region labeled by SRCC technique.
Figure 5:
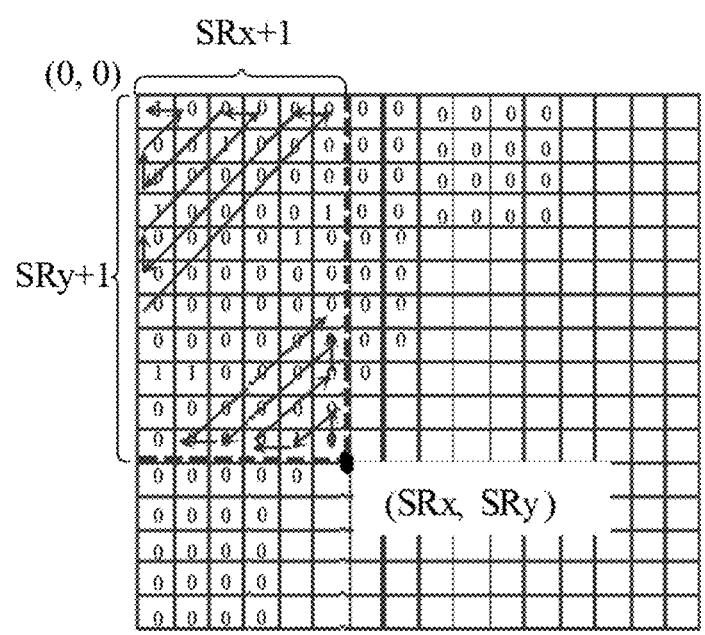
FIG. 5 is a schematic diagram of an order of scanning a labeled scan region.

After transform and quantization of a residual signal nonzero coefficients in a quantization coefficient block are highly likely gather in a left area and an upper area of the block, and 0s generally appear in a right area and a lower area of the block. Therefore, an SRCC technology may be used. Through the SRCC technology, it may be labeled that the size of an upper left area of nonzero coefficients included in each quantization coefficient block (having a size of W×H) is (SRx+1)×(SRy+1). SRx is an abscissa of a rightmost nonzero coefficient in a quantization coefficient block, SRy is an ordinate of a lowermost nonzero coefficient in the quantization coefficient block, and coordinates of an upper left origin are (0, 0). 1≤SRx+1≤W, and 1≤SRy+1≤H. Coefficients outside the area are all 0. In the SRCC technology, a quantization coefficient area that may be scanned in one quantization coefficient block is determined by using (SRx, SRy). As shown in FIG. 4, only quantization coefficients in a scan region labeled by (SRx, SRy) may be coded. A scan order of coding is shown in FIG. 5, and may be an opposite Z shaped scan from the lower right corner to the upper left corner.

The coefficients to be coded within the SRCC scan region are coded using a hierarchical approach. First, coordinates of the SRCC scan region are encoded. Within the SRCC scan region, a flag (significant flag) that identifies whether the coefficient at the current position is 0 is encoded one by one based on the scan order. Meanwhile, non-zero coefficient positions are recorded and the number of non-zero coefficients is calculated. If the number of non-zero coefficients is greater than 0, non-zero coefficient absolute levels and symbols at the corresponding positions may be encoded.

Considering that a boundary of the SRCC scan region depends on positions of rightmost and lowermost non-zero coefficients in the current block, there may be many scenarios where position coefficients are 0 in the SRCC scan region. Therefore, in the SRCC scan order, there may be a scenario where a plurality of consecutive position coefficients are 0. In particular, for example, in the transform skip mode, because there is no transform process, residual coefficient energy is not concentrated, and the distribution of non-zero coefficients may be relatively sparser. In the current AVS3 standard, all positions in the SRCC scan region may be encoded with significant flags to indicate whether the position is a zero coefficient, resulting in some unwanted redundancy.

In the present disclosure, based on a scan order of coefficients in an SRCC scan region during encoding and decoding, and according to distribution characteristics of the coefficients in the SRCC scan region, a method for segmenting SRCC coefficients for encoding is provided. For coefficients in a consecutive part of the scan order, a syntax element is used for indicating whether the coefficients are all zeros, so as to reduce coding redundancy, which is conducive to improving coding efficiency of coefficient coding, and further improving video compression performance.

The coefficient encoding method provided in the present disclosure is not limited to being applied to coefficient encoding in the transform skip mode, but may also be applied to coefficient encoding in other coding modes, for example, applied in coefficient encoding of all blocks, e.g., applied when a picture-level intra prediction transform skip enable flag has a value of 1, applied when a picture-level inter prediction transform skip enable flag has a value of 1, applied when the picture-level intra prediction transform skip enable flag and the picture-level inter prediction transform skip enable flag both have a value of 1, and so on.

In the embodiments of the present disclosure, whether to use the transform skip mode for the coding block may be determined by explicit encoding or implicit selection of transform skip. The explicit encoding means that before the coefficient absolute level is decoded, a flag used for indicating whether to use the transform skip mode for the coding block is decoded, and the decoding result of the flag explicitly indicates whether the current coding block may skip the transformation process. Implicit selection of transform skip means that when or in response to determining that no corresponding flag exists, statistics are collected on decoding results of coefficients, and it is determined whether to skip the transformation process based on the statistical result. For example, all coefficients may be first obtained by decoding, the number of non-zero coefficients among all the coefficients is calculated, and the number of even coefficients among all the coefficients (including zero coefficients) is calculated. Whether to use the transform skip mode for the current coding block is implicitly deduced according to whether the number of non-zero coefficients is an even or odd number or whether the number of even coefficients among all the coefficients is an even or odd number (e.g., when the number of non-zero coefficients is an odd number, it is determined that transform skip has been used for the current coding block; when the number of non-zero coefficients is an even number, it is determined that transform skip has not been used for the current coding block; when the number of even coefficients among all the coefficients is an even number, it is determined that transform skip has been used for the current coding block; or when the number of even coefficients among all the coefficients is an odd number, it is determined that transform skip has not been used for the current coding block).

The picture-level intra prediction transform skip enable flag and the picture-level inter prediction transform skip enable flag are flags used for controlling whether implicit selection of transform skip can be used within/between frames. In the embodiments of the present disclosure, syntax elements related to the transform skip mode are explained below.

Implicit selection of transform skip enable flag ist_skip_enable_flag:

It is a binary variable. It has a value of '1' indicating that implicit selection of transform skip can be used; and a value of '0' indicating that implicit selection of transform skip is not to be used. The value of the variable IstSkipEnableFlag may be obtained by decoding the syntax element ist_skip_enable_flag. If the syntax element ist_skip_enable_flag does not exist in the bitstream, IstSkipEnableFlag may be set to 0.

Inter transform skip enable flag inter_transform_skip_enable_flag:

It is a binary variable. It has a value of '1' indicating that inter transform skip can be used; and a value of '0' indicating that inter transform skip is not to be used. The value of the variable InterTransformSkipEnableFlag may be obtained by decoding the syntax element inter_transform_skip_enable_flag. If the syntax element inter_transform_skip_enable_flag does not exist in the bitstream, InterTransformSkipEnableFlag may be set to 0.

Picture-level intra prediction transform skip enable flag picture_ist_skip_enable_flag:

It is a binary variable. It has a value of '1' indicating that the transform skip method can be used for a luminance intra predicted residual block and a luminance intra block copy predicted residual block of the current image; and a value of '0' indicating that the transform skip method is not to be used for the luminance intra predicted residual block and the luminance intra block copy predicted residual block of the current image. The value of the variable PictureIstSkipEnableFlag may be obtained by decoding the syntax element picure_ist_skip_enable_flag. If the syntax element picture_ist_skip_enable_flag does not exist in the bitstream, PictureIstSkipEnableFlag may be set to 0.

Picture-level inter prediction transform skip enable flag picture_inter_trasform_skip_flag:

It is a binary variable. It has a value of '1' indicating that the transform skip method can be used for a luminance inter predicted residual block of the current image; and a value of '0' indicating that the transform skip method is not to be used for the luminance inter predicted residual block of the current image. The value of PictureInterSkipEnableFlag may be obtained by decoding the syntax element picture_inter_trasform_skip_flag. If the syntax element picture_inter_trasform_skip_flag does not exist in the bitstream, PictureInterSkipEnableFlag may be set to 0.

The implementation details of the technical solutions of the embodiments of the present disclosure are described in detail below with reference to specific application scenarios.

Figure 6:
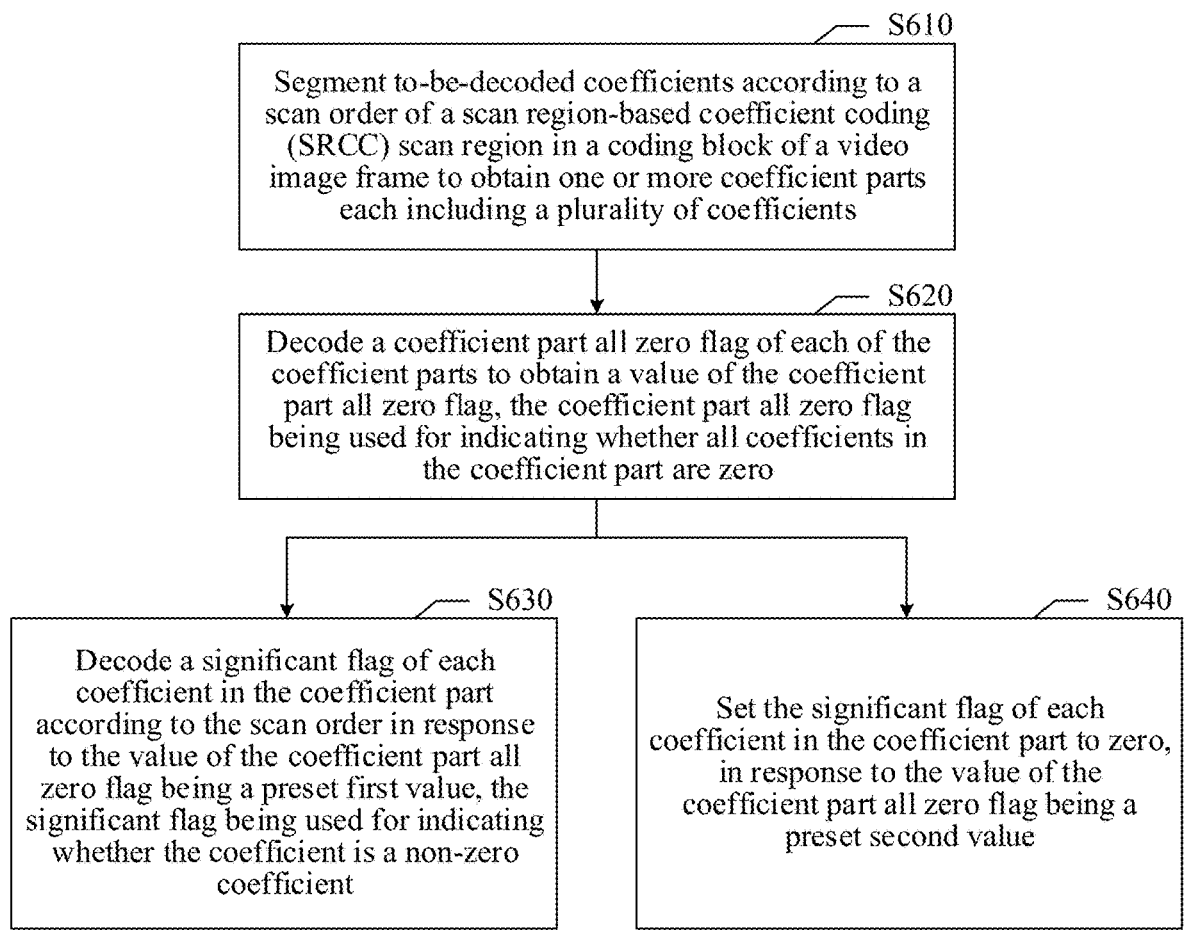
FIG. 6 is a schematic flowchart of steps of a video decoding method according to certain embodiment(s) of the present disclosure.

FIG. 6 is a flowchart of steps of a video decoding method according to an embodiment of the present disclosure. The video decoding method may be performed by a device having a computing processing function, for example, may be performed by a terminal device or a server, or may be performed by an electronic device shown in FIG. 13. Referring to FIG. 6, the video decoding method includes step S610 to step S640 below.

Step S610: Segment to-be-decoded coefficients according to a scan order of a scan region-based coefficient coding (SRCC) scan region in a coding block of a video image frame to obtain one or more coefficient parts each including a plurality of coefficients.

In an embodiment of the present disclosure, a video image frame sequence includes a series of images. Each image may be further partitioned into slices, and the slices may be further partitioned into a series of LCUs (or CTUs), each LCU including a plurality of CUs. The video image frame is coded by block during coding. In some new video coding standards, for example, in the H.264 standard, a macroblock (MB) is provided. The MB may be further partitioned into a plurality of prediction blocks (PB) that may be used for predictive coding. In the HEVC standard, basic concepts such as a CU, a prediction unit (PU), and a transform unit (TU) are used, various block units are partitioned by function, and a new tree-based structure is used for description. For example, a CU may be partitioned into smaller CUs according to a quadtree, and the smaller CUs may be further partitioned to form a quadtree structure. The coding block in this embodiment of the present disclosure may be a CU, or a block smaller than the CU, such as a smaller block obtained by partitioning the CU.

Step S620: Decode a coefficient part all zero flag of each of the coefficient parts to obtain a value of the coefficient part all zero flag, the coefficient part all zero flag being used for indicating whether all coefficients in the coefficient part are zero.

In an embodiment of the present disclosure, the method of decoding the coefficient part all zero flag coef_part_all_zero_flag may include: determining that a decoding method of the coefficient part all zero flag is bypass decoding or conventional decoding (CABAC); decoding the coefficient part all zero flag through a bypass decoding engine in response to the decoding method of the coefficient part all zero flag being bypass decoding; and decoding the coefficient part all zero flag through a conventional decoding engine based on a context model in response to the decoding method of the coefficient part all zero flag being conventional decoding.

In an embodiment of the present disclosure, the same decoding method or different decoding methods may be selected for the coefficient part all zero flags corresponding to different coefficient parts.

Step S630: Decode a significant flag of each coefficient in the coefficient part according to the scan order in response to the value of the coefficient part all zero flag being a preset first value, the significant flag being used for indicating whether the coefficient is a non-zero coefficient.

The preset first value may be, for example, 0. When or in response to determining that the value of the coefficient part all zero flag is 0, it indicates that the coefficients in the corresponding coefficient part are not all zero coefficients, but there are a number of non-zero coefficients. In this scenario, the significant flags of the coefficients in the coefficient part can be respectively decoded in sequence according to the scan order, and it is determined whether the coefficients are non-zero coefficients. In an embodiment of the present disclosure, if a significant flag of a coefficient obtained by decoding is 0, it indicates that the coefficient is a zero coefficient; and if a significant flag of a coefficient obtained by decoding is 1, it indicates that the coefficient is a non-zero coefficient.

Step S640: Skip decoding the significant flag and set the significant flag of each coefficient in the coefficient part to zero, in response to the value of the coefficient part all zero flag being a preset second value.

The preset second value may be, for example, 1. When or in response to determining that the value of the coefficient part all zero flag obtained by decoding is 1, it indicates that the coefficients in the corresponding coefficient part are all zero coefficients. It is unnecessary to decode the significant flag of each coefficient, and the significant flags of all coefficients in the corresponding coefficient part may be directly set to 0.

After decoding or setting a value of the significant flag, it can be determined that each coefficient in the coding block is a zero coefficient or a non-zero coefficient. For a non-zero coefficient, a corresponding syntax element can be continuously decoded to obtain an absolute value and a symbol of the non-zero coefficient.

In the video decoding method provided in the embodiments of the present disclosure, based on a scan order of coefficients in an SRCC region during encoding and decoding, a coefficient part is formed for some coefficients in a consecutive part of the scan order according to distribution characteristics of the coefficients in the SRCC region, and a syntax element is used for indicating whether the coefficients in this coefficient part are all zero coefficients, so that coding redundancy can be reduced, which is conducive to improving coding efficiency of coefficient coding, and further improving video compression performance.

In an embodiment of the present disclosure, the method for segmenting to-be-decoded coefficients according to a scan order of an SRCC scan region may include: obtaining a coefficient part length, the coefficient part length being used for representing a maximum number of coefficients included in the coefficient part; and sequentially determining consecutive to-be-decoded coefficients according to the scan order of the SRCC scan region, and forming a number of coefficients equal to or less than the coefficient part length into one coefficient part.

In an embodiment of the present disclosure, the coefficient part length CUT_NUM is a constant determined according to a maximum transformation unit size or is a dynamic parameter determined according to attribute information of the coding block. The attribute information of the coding block may include at least one of following information: a size of a current transformation unit, a shape of the current transformation unit, coordinates of the SRCC scan region, and a number of coefficients in the SRCC scan region.

In this embodiment of the present disclosure, according to a maximum TU size set by the codec, the coefficient part length CUT_NUM in the codec can be directly set to a constant that does not exceed the maximum TU size, for example, the maximum TU size is 64*64, and the CUT_NUM=16.

In this embodiment of the present disclosure, the coefficient part length CUT_NUM may also be dynamically set according to factors such as a current TU size, a current TU shape, coordinates of the SRCC scan region, and the number of SRCC coefficients. In summary, the CUT_NUM value may be set in various manners, which are not limited to the examples.

In this embodiment of the present disclosure, the number of coefficients in each coefficient part may be set as group_coef_num=CUT_NUM. When or in response to determining that num_coef % CUT_NUM !=0, that is, when or in response to determining that the total number of coefficients in the SRCC scan region is not an integer multiple of CUT_NUM, after segment encoding, there is a coefficient part with the number of coefficients less than CUT_NUM, that is, the number of coefficients of the coefficient part is group_coef_num=num_coef % CUT_NUM (group_coef_num<CUT_NUM). In this embodiment of the present disclosure, the coefficients may be placed in a particular position in the SRCC scan region, for example, the first part at the beginning of the scan order.

In an embodiment of the present disclosure, the coefficient part all zero flag may be decoded by bypass decoding or conventional decoding. The conventional decoding desires assigning a suitable probability model for each inputted binary bit according to a value of a previously decoded syntax element or binary bit, that is, assigning a context model for the coefficient part all zero flag to be decoded.

Figure 7:
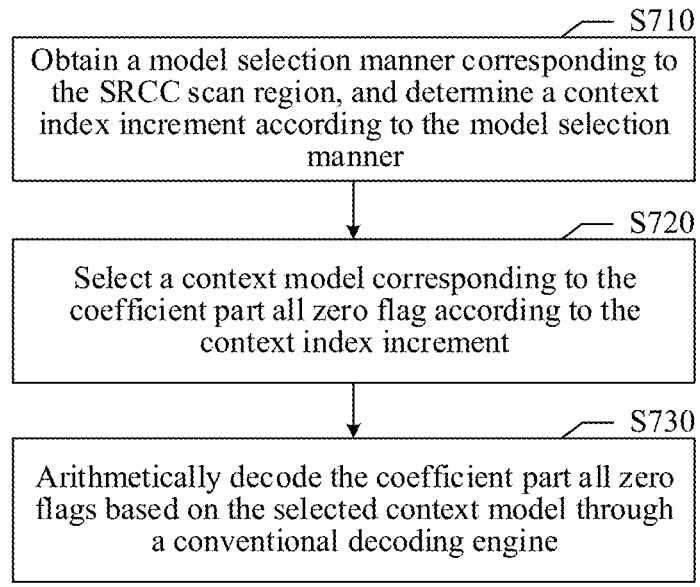
FIG. 7 is a schematic flowchart of steps of decoding a coefficient part all zero flag by conventional decoding according to certain embodiment(s) of the present disclosure.

FIG. 7 is a flowchart of steps of decoding a coefficient part all zero flag by conventional decoding according to an embodiment of the present disclosure. On the basis of the above embodiments, the method for decoding the coefficient part all zero flag through a conventional decoding engine based on a context model may include the following step S710 to step S730:

Step S710: Obtain a model selection manner corresponding to the SRCC scan region, and determine a context index increment according to the model selection manner.

In this embodiment of the present disclosure, a fixed model selection mode may be preset in the encoder and the decoder, or a mode may be dynamically selected from a plurality of selectable model selection modes according to the current coding block. For a plurality of coding blocks in a video image frame, a same model selection method may be used, or different model selection methods may be used.

Step S720: Select a context model corresponding to the coefficient part all zero flag according to the context index increment.

A context model corresponding to a syntax element can be located via a context index increment ctxIdxInc and a context index start ctxIdxStart. Different probability models may be assigned to the coefficient part all zero flag based on the context index increment ctxIdxInc with different values.

Step S730: Arithmetically decode the coefficient part all zero flags based on the selected context model through a conventional decoding engine.

The selected context model and the coefficient part all zero flag to be decoded are loaded into the conventional decoding engine, and a decoding operation on the coefficient part all zero flag may be performed by the conventional decoding engine to obtain a corresponding flag value. The conventional decoding engine in this embodiment of the present disclosure may be a binary arithmetic decoder based on the CABAC technology.

In an embodiment of the present disclosure, available model selection manners may include three modes: setting the context index increment according to a shape of the SRCC scan region in response to the model selection manner being a first mode; setting the context index increment according to an area of the SRCC scan region in response to the model selection manner being a second mode; and setting the context index increment according to the preset first value in response to the model selection manner being a third mode.

Figure 8:
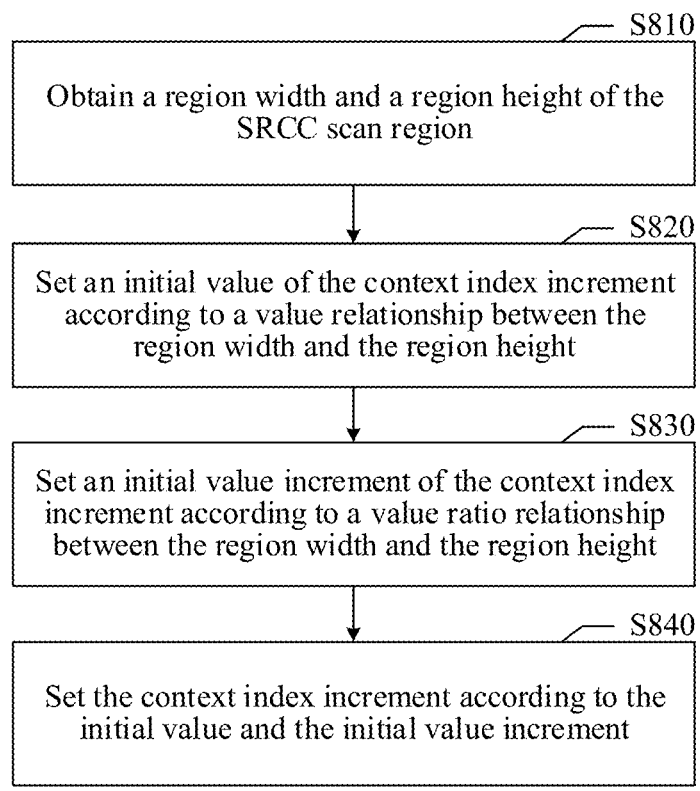
FIG. 8 is a schematic flowchart of steps of determining a context index increment based on a first mode according to certain embodiment(s) of the present disclosure.

FIG. 8 is a flowchart of steps of determining a context index increment based on a first mode according to an embodiment of the present disclosure. As shown in FIG. 8, based on the above embodiments, the method for setting the context index increment according to a shape of the SRCC scan region may include the following step S810 to step S840.

Step S810: Obtain a region width and a region height of the SRCC scan region.

In an embodiment of the present disclosure, the SRCC scan region may be a rectangular region shown in FIG. 4. When a right abscissa scan_region_x and a bottom ordinate scan_region_y of the SRCC scan region in the current coding block are obtained after decoding, it can be determined that the region width of the SRCC scan region is sr_width=scan_region_x+1, and the region height is sr_height=scan_region_y+1.

Step S820: Set an initial value of the context index increment according to a value relationship between the region width and the region height.

In an embodiment of the present disclosure, by comparing values of the region width and the region height, the initial value of the context index increment may be set based on different preset values, including: setting the initial value of the context index increment to the preset second value in response to a value of the region width being equal to a value of the region height; setting the initial value of the context index increment to a preset third value in response to the region width being less than the region height; and setting the initial value of the context index increment to a preset fourth value in response to the region width being greater than the region height.

For example, the second value may be 1, the third value may be 2, and the fourth value may be 5. On this basis, the method logic for setting the initial value of the context index increment is: ctxIdxInc=((sr_width==sr_height) ? 1:(sr_width<sr_height ? 2:5)). That is: if the region width sr_width and the region height sr_height are equal, the initial value ctxIdxInc of the context index increment is set to 1; if the region width sr_width is less than the region height sr_height, the initial value ctxIdxInc of the context index increment is set to 2; and if the region width sr_width is greater than the region height sr_height, the initial value ctxIdxInc of the context index increment is set to 5.

Step S830: Set an initial value increment of the context index increment according to a value ratio relationship between the region width and the region height.

In an embodiment of the present disclosure, the method for setting an initial value increment of the context index increment may include: calculating a value ratio between the larger one and the smaller one of the region width and the region height; and comparing the value ratio with a plurality of preset ratio thresholds and setting the initial value increment delta of the context index increment according to a result of the comparison. In this embodiment of the present disclosure, the initial value of the context index increment may be negatively correlated with the value ratio. For example, the ratio=(sr_width<sr_height) ? (sr_height/sr_width):(sr_width/sr_height), and delta=(ratio>=3) ? 0:((ratio>=2) ? 1:2). In this embodiment of the present disclosure, if the region width sr_width is less than the region height sr_height, the ratio obtained by dividing the larger value sr_height by the smaller value sr_width is used as the value ratio; and if the region height sr_height is less than (or equal to) the region width sr_width, the ratio obtained by dividing the larger value sr_width by the smaller value sr_height is used as the value ratio. Take two preset ratio thresholds as 2 and 3, if the value ratio is greater than or equal to 3, the initial value increment delta of the context index increment is set to 0; if the value ratio is less than 3 and greater than or equal to 2, the initial value increment delta of the context index increment is set to 1; and if the value ratio is less than 2, the initial value increment delta of the context index increment is set to 2. The values involved in the embodiments of the present disclosure are only examples, and other values may be selected in specific application scenarios, which are not specifically limited in the embodiments of the present disclosure.

Step S840: Set the context index increment according to the initial value and the initial value increment.

In an embodiment of the present disclosure, if the value of the region width is equal to that of the region height, the context index increment is set to the initial value, that is, ctxIdxInc+=0; and if the value of the region width is not equal to that of the region height, the context index increment ctxIdxInc is set to a sum of the initial value and the initial value increment delta, that is, ctxIdxInc+=delta.

Figure 9:
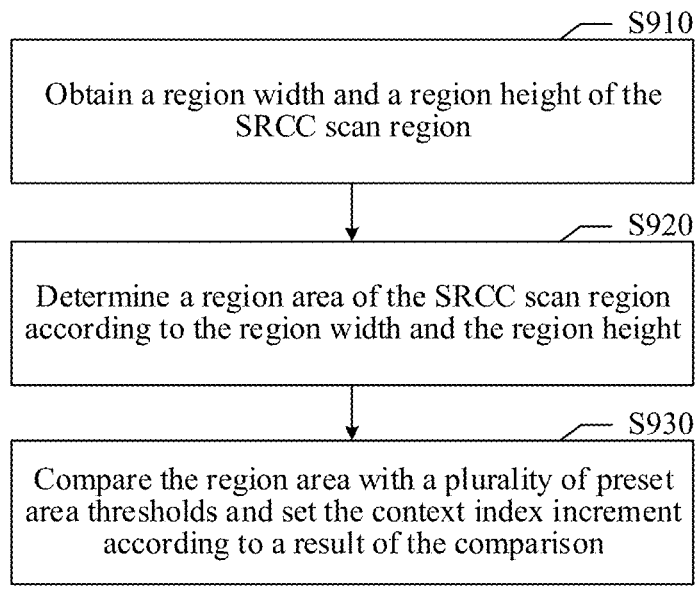
FIG. 9 is a schematic flowchart of steps of determining a context index increment based on a second mode according to certain embodiment(s) of the present disclosure.

FIG. 9 is a flowchart of steps of determining a context index increment based on a second mode according to an embodiment of the present disclosure. As shown in FIG. 9, on the basis of the above embodiments, the method for setting the context index increment according to an area of the SRCC scan region may include the following step S910 to step S930.

Step S910: Obtain a region width and a region height of the SRCC scan region.

In an embodiment of the present disclosure, the SRCC scan region may be a rectangular region shown in FIG. 4. When a right abscissa scan_region_x and a bottom ordinate scan_region_y of the SRCC scan region in the current coding block are obtained after decoding, it can be determined that the region width of the SRCC scan region is sr_width=scan_region_x+1, and the region height is sr_height=scan_region_y+1.

Step S920: Determine a region area of the SRCC scan region according to the region width and the region height.

When or in response to determining that the SRCC scan region is a rectangular region, the region area sr_area is equal to a product of the region width sr_width and the region height sr_height, that is, sr_area=sr_width*sr_height.

Step S930: Compare the region area with a plurality of preset area thresholds and set the context index increment according to a result of the comparison.

In an embodiment of the present disclosure, the value of the context index increment may be positively correlated with the region area of the SRCC scan region. For example, taking three area thresholds as 16, 32, and 64, ctxIdxInc=(sr_area<16) ? 0:((sr_area<32) ? 1:(sr_area<64) ? 2:3). If the region area sr_area is less than 16, the context index increment ctxIdxInc is set to 0; if the region area sr_area is greater than or equal to 16 and less than 32, the context index increment ctxIdxInc is set to 1; if the region area sr_area is greater than or equal to 32 and less than 64, the context index increment ctxIdxInc is set to 2; and if the region area sr_area is greater than or equal to 64, the context index increment ctxIdxInc is set to 3. The values involved in the embodiments of the present disclosure are only examples, and other values may be selected in specific application scenarios, which are not specifically limited in the embodiments of the present disclosure.

In an embodiment of the present disclosure, when or in response to determining that the context index increment is determined using the third mode, a preset first value may be directly used as the context index increment, so that a single context model can be determined. For example, the first value is 0 (by way example only). The context index increment may be set to ctxIdxInc=0, that is, with no increment being added, the corresponding context model is directly located using the context index start ctxIdxStart.

In the technical solutions provided in the embodiments of the present disclosure, coefficient part all zero flags of each coefficient part can be selectively decoded. After the SRCC scan region of the coding block is segmented, a plurality of coefficient parts can be obtained. After that, coefficient part all zero flags may be decoded for all coefficient parts, or coefficient part all zero flags may be decoded for only some of the coefficient parts.

In an embodiment of the present disclosure, before a coefficient part zero flag of the coefficient part is decoded, it can be determined whether a preset decoding skip condition is satisfied; and if the decoding skip condition is satisfied, the step of decoding the coefficient part all zero flag is skipped and the value of the coefficient part all zero flag is set to the preset second value. For example, the second value is taken as 1, that is, a coefficient part where coefficient part all zero flags are not decoded is an all-zero coefficient part including zero coefficients by default.

In an embodiment of the present disclosure, the decoding skip condition includes at least one of the following conditions: the number of coefficients in the coefficient part is less than a preset number threshold; and an area proportion that the SRCC scan region accounts for in the coding block is less than a preset proportion threshold.

In an implementation, when or in response to determining that the number of coefficients in the coefficient part is less than the preset number threshold, the step of decoding the coefficient part all zero flag of the coefficient part is skipped, and the value of the coefficient part all zero flag is set to the preset first value. For example, the coefficient part length CUT_NUM in the above embodiments is used as the number threshold. When or in response to determining that the number of coefficients group_coef_num of a coefficient part is less than the number threshold, it is unnecessary to decode the coefficient part all zero flag coef_part_all_zero_flag of the coefficient part, and coef_part_all_zero_flag=0, it indicates that for all coefficients in the coefficient part, a significant flag of each coefficient may be decoded in sequence according to the scan order, thereby determining whether each coefficient is a non-zero coefficient.

In an implementation, when or in response to determining that the area ratio of the SRCC scan region in the coding block is less than a preset ratio threshold, the step of decoding the coefficient part all zero flag of the coefficient part is skipped, and the value of the coefficient part all zero flag is set to the preset first value. For example, sr_area_per= (sr_width*sr_height)/(width*height), where width and height are respectively the length and the width of the current coding block, and sr_area_per is the area ratio of the SRCC scan region in the coding block. When or in response to determining that the area ratio sr_area_per corresponding to a coefficient part is less than the set ratio threshold, it is unnecessary to decode the coef_part_all_zero_flag of the coefficient part, and coef_part_all_zero_flag=0, it indicates that for all coefficients in the coefficient part, a significant flag of each coefficient may be decoded in sequence according to the scan order, thereby determining whether each coefficient is a non-zero coefficient.

In an implementation, when or in response to determining that the number of coefficients in the coefficient part is less than the preset number threshold, and when or in response to determining that the area ratio of the SRCC scan region in the coding block is less than a preset ratio threshold, the step of decoding the coefficient part all zero flag of the coefficient part is skipped, and the value of the coefficient part all zero flag is set to the preset first value.

In an embodiment of the present disclosure, in response to existence of a particular coefficient part including a number of coefficients less than the coefficient part length, the particular coefficient part is located at a particular position in the SRCC scan region. For example, the particular position may be a scan start position or a scan end position in the SRCC scan region. Correspondingly, the particular coefficient part may be a first coefficient part or a last coefficient part in the scan order.

Figure 10:
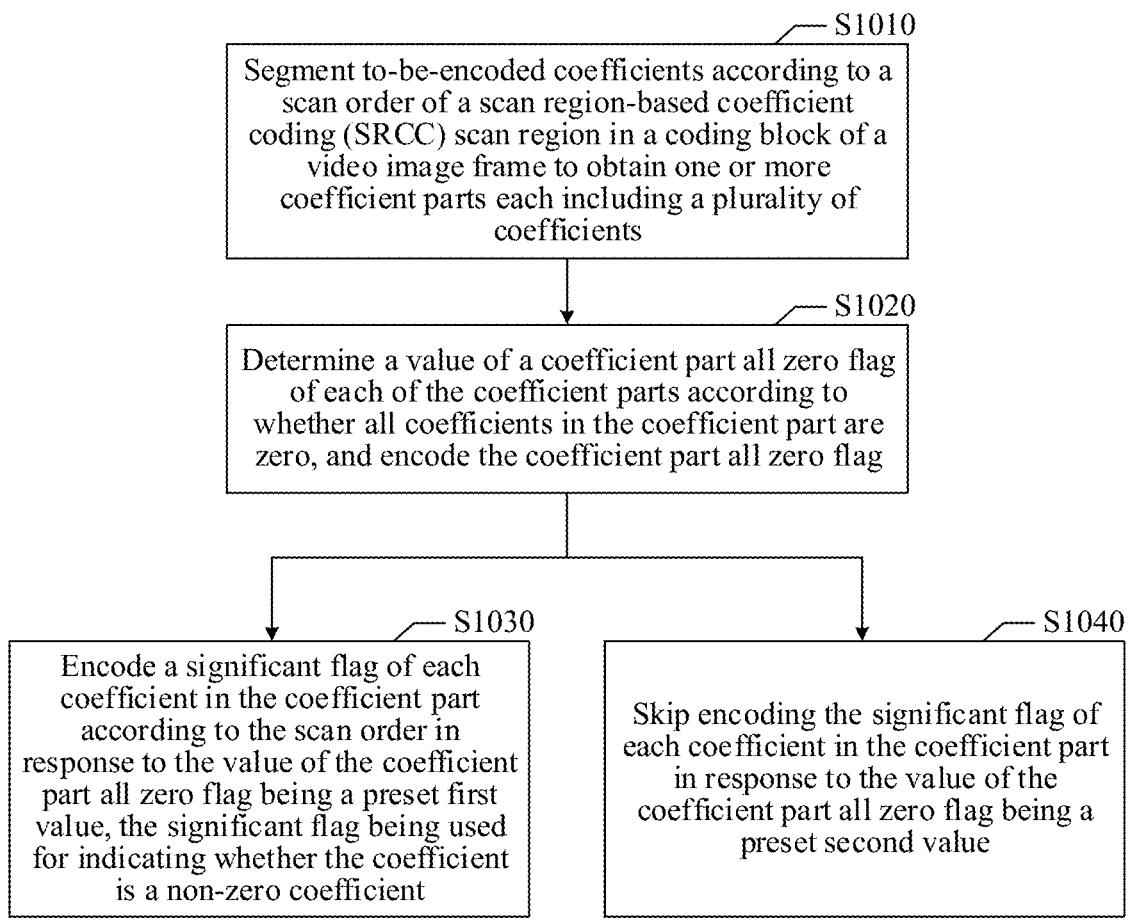
FIG. 10 is a schematic flowchart of steps of a video encoding method according to certain embodiment(s) of the present disclosure.

In the above embodiments, the decoding solution of segmented decoding coefficients in the SRCC scan region is described from the perspective of the decoder side. Encoding solution corresponding to the above embodiments may be used at the encoder side. FIG. 10 is a flowchart of steps of a video encoding method according to an embodiment of the present disclosure. The video coding method may be performed by a device having a computing processing function, for example, may be performed by a terminal device or a server, or may be performed by an electronic device shown in FIG. 13. As shown in FIG. 10, the video encoding method may include the following steps S1010 to S1040.

Step S1010: Segment to-be-encoded coefficients according to a scan order of a scan region-based coefficient coding (SRCC) scan region in a coding block of a video image frame to obtain one or more coefficient parts each including a plurality of coefficients.

Step S1020: Determine a value of a coefficient part all zero flag of each of the coefficient parts according to whether all coefficients in the coefficient part are zero, and encode the coefficient part all zero flag.

Step S1030: Encode a significant flag of each coefficient in the coefficient part according to the scan order in response to the value of the coefficient part all zero flag being a preset first value, the significant flag being used for indicating whether the coefficient is a non-zero coefficient.

Step S1040: Skip encoding the significant flag of each coefficient in the coefficient part in response to the value of the coefficient part all zero flag being a preset second value.

In this embodiment of the present disclosure, if the value of the coefficient part all zero flag is the preset second value, it indicates that each coefficient in the coefficient part is a zero coefficient, without the may encode the significant flag of each coefficient in the coefficient part.

The relevant content details of the video encoding method in the embodiments of the present disclosure correspond to the video decoding method in the above embodiments, and will not be repeated here.

Based on the above embodiments, in the present disclosure, based on a scan order of coefficients in an SRCC region during encoding and decoding, and according to distribution characteristics of the coefficients in the SRCC region, a method for segmenting SRCC coefficients for encoding is provided. For coefficients in a consecutive part of the scan order, a syntax element is used for indicating whether the coefficients are all zeros, so as to reduce coding redundancy, which is conducive to improving coding efficiency of coefficient coding, and further improving video compression performance. In the above embodiments, the decoder side is used as an example for describing the SRCC coefficient encoding and decoding method provided in the embodiments of the present disclosure, but the relevant technical solutions can also be applied to the encoder side, and the present disclosure is not limited thereto.

Although the steps of the method in the present disclosure are described in a specific order in the accompanying drawings, this does not desire or imply that the steps have to be performed in the specific order, or all the steps shown have to be performed to achieve an expected result. Additionally or alternatively, some steps may be omitted, a plurality of steps may be combined into one step, and/or one step may be decomposed into a plurality of steps for execution, and the like.

Figure 11:
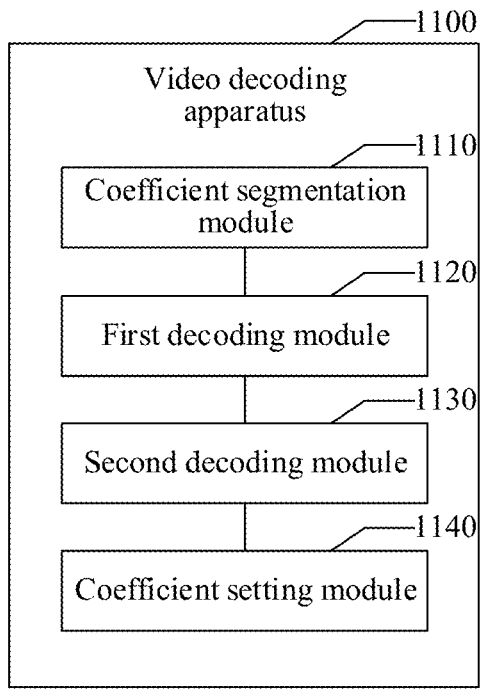
FIG. 11 is a schematic structural block diagram of a video encoding apparatus according to certain embodiment(s) of the present disclosure.

The following describes apparatus embodiments of the present disclosure, and the apparatus embodiments may be used for performing the video encoding and decoding methods in the embodiments of the present disclosure. FIG. 11 is a structural block diagram of a video decoding apparatus according to an embodiment of the present disclosure. As shown in FIG. 11, the video decoding apparatus 1100 may include:

a coefficient segmentation module 1110, configured to segment to-be-decoded coefficients according to a scan order of a scan region-based coefficient coding (SRCC) scan region in a coding block of a video image frame to obtain one or more coefficient parts each including a plurality of coefficients; a first decoding module 1120, configured to decode a coefficient part all zero flag of each of the coefficient parts to obtain a value of the coefficient part all zero flag, the coefficient part all zero flag being used for indicating whether all coefficients in the coefficient part are zero; a second decoding module 1130, configured to decode a significant flag of each coefficient in the coefficient part according to the scan order in response to the value of the coefficient part all zero flag being a preset first value, the significant flag being used for indicating whether the coefficient is a non-zero coefficient; and a coefficient setting module 1140, configured to set the significant flag of each coefficient in the coefficient part to zero, in response to the value of the coefficient part all zero flag being a preset second value.

In some embodiments of the present disclosure, based on the above embodiments, the first decoding module 1120 includes: a mode determining unit, configured to determine that a decoding method of the coefficient part all zero flag is bypass decoding or conventional decoding; a bypass decoding unit, configured to decode the coefficient part all zero flag through a bypass decoding engine in response to the decoding method of the coefficient part all zero flag being bypass decoding; and a conventional decoding unit, configured to decode the coefficient part all zero flag through a conventional decoding engine based on a context model in response to the decoding method of the coefficient part all zero flag being conventional decoding.

In some embodiments of the present disclosure, based on the above embodiments, the conventional decoding unit includes: an increment determining subunit, configured to obtain a model selection manner corresponding to the SRCC scan region, and determine a context index increment according to the model selection manner; a model selection subunit, configured to select a context model corresponding to the coefficient part all zero flag according to the context index increment; and an arithmetic decoding subunit, configured to arithmetically decode the coefficient part all zero flags based on the selected context model through a conventional decoding engine.

In some embodiments of the present disclosure, based on the above embodiments, the increment determining subunit is further configured to: set the context index increment according to a shape of the SRCC scan region in response to the model selection manner being a first mode; set the context index increment according to an area of the SRCC scan region in response to the model selection manner being a second mode; and set the context index increment according to the preset first value in response to the model selection manner being a third mode.

In some embodiments of the present disclosure, based on the above embodiments, the increment determining subunit is further configured to: obtain a region width and a region height of the SRCC scan region; set an initial value of the context index increment according to a value relationship between the region width and the region height; set an initial value increment of the context index increment according to a value ratio relationship between the region width and the region height; and set the context index increment according to the initial value and the initial value increment.

In some embodiments of the present disclosure, based on the above embodiments, the increment determining subunit is further configured to: set the initial value of the context index increment to the preset second value in response to a value of the region width being equal to a value of the region height; set the initial value of the context index increment to a preset third value in response to the region width being less than the region height; and set the initial value of the context index increment to a preset fourth value in response to the region width being greater than the region height.

In some embodiments of the present disclosure, based on the above embodiments, the increment determining subunit is further configured to: calculate a value ratio between the larger one and the smaller one of the region width and the region height; and compare the value ratio with a plurality of preset ratio thresholds and set the initial value increment of the context index increment according to a result of the comparison.

In some embodiments of the present disclosure, based on the above embodiments, the increment determining subunit is further configured to: set the context index increment to the initial value in response to the value of the region width being equal to the value of the region height; and set the context index increment to a sum of the initial value and the initial value increment in response to the value of the region width being not equal to the value of the region height.

In some embodiments of the present disclosure, based on the above embodiments, the increment determining subunit is further configured to: obtain a region width and a region height of the SRCC scan region; determine a region area of the SRCC scan region according to the region width and the region height; and compare the region area with a plurality of preset area thresholds and set the context index increment according to a result of the comparison.

In some embodiments of the present disclosure, based on the above embodiments, the video decoding apparatus 1100 further includes: a condition determining module, configured to determine whether a preset decoding skip condition is met; and a decoding skipping module, configured to skip the step of decoding the coefficient part all zero flag and set the value of the coefficient part all zero flag to the preset first value, in response to the decoding skip condition being satisfied.

In some embodiments of the present disclosure, based on the above embodiments, the decoding skip condition includes at least one of the following conditions: the number of coefficients in the coefficient part is less than a preset number threshold; and an area proportion that the SRCC scan region accounts for in the coding block is less than a preset proportion threshold.

In some embodiments of the present disclosure, based on the above embodiments, the coefficient segmentation module 1110 includes: a length obtaining unit, configured to obtain a coefficient part length, the coefficient part length being used for representing a maximum number of coefficients included in the coefficient part; and a coefficient segmentation unit, configured to sequentially determine consecutive to-be-decoded coefficients according to the scan order of the SRCC scan region, and form a number of coefficients equal to or less than the coefficient part length into one coefficient part.

In some embodiments of the present disclosure, based on the above embodiments, the coefficient part length is a constant determined according to a maximum transformation unit size or is a dynamic parameter determined according to attribute information of the coding block.

In some embodiments of the present disclosure, based on the above embodiments, the attribute information of the coding block includes at least one of the following information: a size of a current transformation unit, a shape of the current transformation unit, coordinates of the SRCC scan region, and a number of coefficients in the SRCC scan region.

In some embodiments of the present disclosure, based on the above embodiments, the method is applied to a coding block satisfying a preset encoding condition, and the coding block satisfying the preset encoding condition includes: a coding block in a transform skip mode; a coding block with a picture-level intra prediction transform skip enable flag value of 1; a coding block with a picture-level inter prediction transform skip enable flag value of 1; a coding block with a picture-level intra prediction transform skip enable flag value of 1 and a picture-level inter prediction transform skip enable flag value of 1; or all coding blocks.

Figure 12:
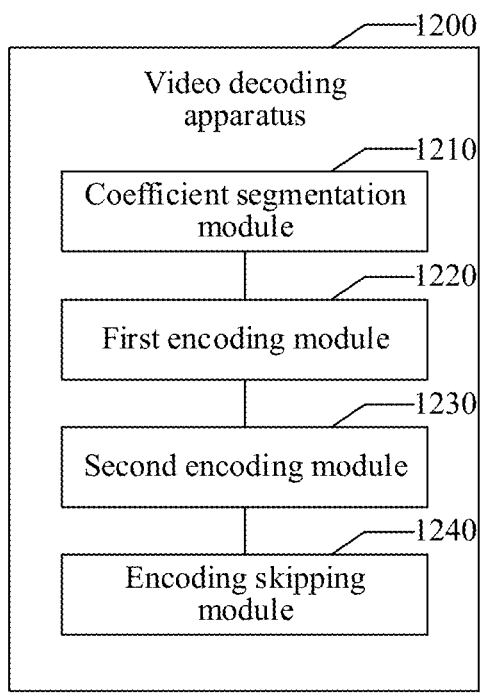
FIG. 12 is a schematic structural block diagram of a video decoding apparatus according to certain embodiment(s) of the present disclosure.

FIG. 12 is a structural block diagram of a video encoding apparatus according to an embodiment of the present disclosure. As shown in FIG. 12, the video encoding apparatus 1200 may include: a coefficient segmentation module 1210, configured to segment to-be-encoded coefficients according to a scan order of a scan region-based coefficient coding (SRCC) scan region in a coding block of a video image frame to obtain one or more coefficient parts each including a plurality of coefficients; a first encoding module 1220, configured to determine a value of a coefficient part all zero flag of each of the coefficient parts according to whether all coefficients in the coefficient part are zero, and encoding the coefficient part all zero flag; a second encoding module 1230, configured to encode a significant flag of each coefficient in the coefficient part according to the scan order in response to the value of the coefficient part all zero flag being a preset first value, the significant flag being used for indicating whether the coefficient is a non-zero coefficient; and an encoding skipping module 1240, configured to skip encoding the significant flag of each coefficient in the coefficient part in response to the value of the coefficient part all zero flag being a preset second value.

Details of the video decoding apparatus provided in the embodiments of the present disclosure have been described in detail in the corresponding method embodiments, and will not be repeated here.

Figure 13:
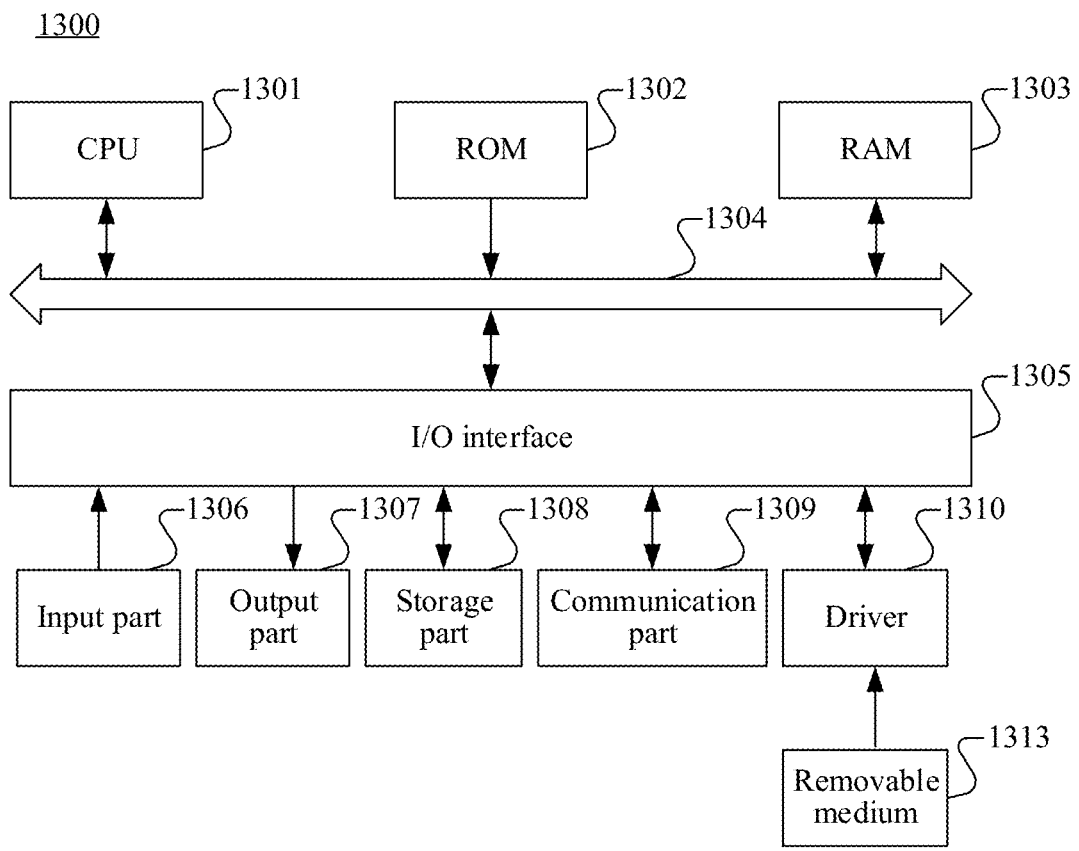
FIG. 13 is a schematic structural block diagram of a computer system of an electronic device according to certain embodiment(s) of the present disclosure.

FIG. 13 is a structural block diagram of a computer system of an electronic device adapted to implement an embodiment of the present disclosure.

A computer system 1300 of the electronic device shown in FIG. 13 is merely an example, and does not constitute any limitation on functions and use ranges of the embodiments of the present disclosure.

As shown in FIG. 13, the computer system 1300 includes a central processing unit (CPU) 1301. The CPU 1301 may perform various appropriate actions and processing according to a program stored in a read-only memory (ROM) 1302 or a program loaded from a storage part 1308 into a random access memory (RAM) 1303. The random access memory 1303 further stores various programs and data desired for system operations. The central processing unit 1301, the read-only memory 1302, and the random access memory 1303 are connected to each other via a bus 1304. An input/output (I/O) interface 1305 is also connected to the bus 1304.

The following components are connected to the input/output interface 1305: an input part 1306 including a keyboard and a mouse, etc.; an output part 1307 including a cathode ray tube (CRT), a liquid crystal display (LCD), a speaker, or the like; a storage part 1308 including hard disk, etc.; and a communication part 1309 including a network interface card such as a local area network card or a modem, etc. The communication part 1309 performs communication processing by using a network such as the Internet. A driver 1310 is also connected to the input/output interface 1305 as desired. A removable medium 1313, such as a disk, an optical disc, a magneto-optical disc, or a semiconductor memory, is installed on the drive 1310 as desired, so that a computer program read from the removable medium 1313 is installed in the storage part 1308 as desired.

Particularly, according to the embodiments of the present disclosure, the processes described in the method flowcharts may be implemented as computer software programs. For example, the embodiments of the present disclosure include a computer program product, including a computer program carried on a computer-readable medium, the computer program including program code used for performing the methods shown in the flowcharts. In such an embodiment, the computer program may be downloaded and installed from a network through the communication part 1309, and/or installed from the removable medium 1313. When the computer program is executed by the central processing unit 1301, the various functions defined in the system of the present disclosure are executed.

In the technical solutions provided in the embodiments of the present disclosure, based on a scan order of coefficients in an SRCC scan region during encoding and decoding, and according to distribution characteristics of the coefficients in the SRCC scan region, a method for segmenting SRCC coefficients for encoding is provided. For coefficients in a consecutive part of the scan order, a syntax element is used for indicating whether the coefficients are all zeros, so that coding redundancy can be reduced, which is conducive to improving coding efficiency of coefficient coding, and further improving video compression performance.

The non-volatile computer-readable medium shown in the embodiments of the present disclosure may be a computer-readable signal medium or a computer-readable storage medium or any combination thereof. The computer-readable storage medium may be, for example, but is not limited to, an electrical, magnetic, optical, electromagnetic, infrared, or semiconductor system, apparatus, or device, or any combination thereof. A more specific example of the computer-readable storage medium may include but is not limited to: an electrical connection having one or more wires, a portable computer magnetic disk, a hard disk, a RAM, a ROM, an erasable programmable read-only memory (EPROM), a flash memory, an optical fiber, a compact disc read-only memory (CD-ROM), an optical storage device, a magnetic storage device, or any appropriate combination thereof. In the present disclosure, the computer-readable storage medium may be any tangible medium including or storing a program, and the program may be used by or used in combination with an instruction execution system, apparatus, or device. In the present disclosure, the computer-readable signal medium may include a data signal being in a baseband or transmitted as a part of a carrier, which carries computer-readable program code. A data signal propagated in such a way may assume a plurality of forms, including, but not limited to, an electromagnetic signal, an optical signal, or any appropriate combination thereof. The computer-readable signal medium may alternatively be any computer-readable medium other than the computer-readable storage medium. The computer-readable medium may send, propagate or transmit a program that is used by or used in combination with an instruction execution system, apparatus or device. The program code included in the readable storage medium may be transmitted using any suitable medium, including but not limited to: a wireless medium, a wired medium, etc., or any suitable combination thereof.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

The flowcharts and block diagrams in the accompanying drawings illustrate possible system architectures, functions, and operations that may be implemented by a system, a method, and a computer program product according to various embodiments of the present disclosure. In this regard, each box in the flowchart or the block diagram may represent a module, a program segment, or a part of code. The module, the program segment, or the part of code includes one or more executable instructions used for implementing specified logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each box in a block diagram or a flowchart and a combination of boxes in the block diagram or the flowchart may be implemented by using a dedicated hardware-based system configured to perform a designated function or operation, or may be implemented by using a combination of dedicated hardware and a computer instruction.

Although a plurality of modules or units of a device configured to perform actions are discussed in the detailed description, such division is not mandatory. Actually, according to the implementations of the present disclosure, the features and functions of two or more modules or units described above may be implemented in one module or unit. On the contrary, the features and functions of one module or unit described above may be further divided to be embodied by a plurality of modules or units.

According to the descriptions of the implementations, a person skilled in the art may readily understand that the exemplary implementations described herein may be implemented by using software, or may be implemented by combining software and suitable hardware. Therefore, the technical solutions of the implementations of the present disclosure may be implemented in a form of a software product. The software product may be stored in a non-volatile storage medium (which may be a CD-ROM, a USB flash drive, a removable hard disk, or the like) or on a network, including several instructions for instructing a computing device (which may be a personal computer, a server, a touch terminal, a network device, or the like) to perform the methods according to the implementations of the present disclosure.

Other embodiments of the present disclosure will be apparent to a person skilled in the art from consideration of the present disclosure and practice of the disclosure here. The present disclosure is intended to cover any variations, uses, or adaptive changes of the present disclosure following the general principles of the present disclosure, and includes well-known knowledge and conventional technical means in the art and undisclosed in the present disclosure.

What is claimed is:

1. A video decoding method, executed by an electronic device, the method comprising:
   segmenting to-be-decoded coefficients according to a scan order of a scan region-based coefficient coding (SRCC) scan region in a coding block of a video image frame to obtain one or more coefficient parts;
   decoding a coefficient part all zero flag of each of the coefficient parts to obtain a value of the coefficient part all zero flag, the coefficient part all zero flag being used for indicating whether all coefficients in the coefficient part are zero;
   decoding a significant flag of each coefficient in the coefficient part according to the scan order in response to the value of the coefficient part all zero flag being a preset first value, the significant flag being used for indicating whether the coefficient is a non-zero coefficient; and
   skipping decoding the significant flag and setting the significant flag of each coefficient in the coefficient part to zero, in response to the value of the coefficient part all zero flag being a preset second value.

2. The video decoding method according to claim 1, wherein segmenting the to-be-decoded coefficients comprises:
   obtaining a coefficient part length, the coefficient part length being used for representing a maximum number of coefficients comprised in the coefficient part; and
   determining consecutive to-be-decoded coefficients according to the scan order of the SRCC scan region, and forming a number of coefficients equal to or less than the coefficient part length into one coefficient part.

3. The video decoding method according to claim 2, wherein the coefficient part length is a constant determined according to a maximum transformation unit size or is a dynamic parameter determined according to attribute information of the coding block.

4. The video decoding method according to claim 3, wherein the attribute information of the coding block includes at least one of: a size of a current transformation unit, a shape of the current transformation unit, coordinates of the SRCC scan region, and a number of coefficients in the SRCC scan region.

5. The video decoding method according to claim 1, wherein decoding the coefficient part all zero flag of each of the coefficient parts comprises:
   determining that a decoding method of the coefficient part all zero flag is bypass decoding or conventional decoding;
   decoding the coefficient part all zero flag through a bypass decoding engine in response to the decoding method of the coefficient part all zero flag being bypass decoding; and
   decoding the coefficient part all zero flag through a conventional decoding engine based on a context model in response to the decoding method of the coefficient part all zero flag being conventional decoding.

6. The video decoding method according to claim 5, wherein decoding the coefficient part all zero flag comprises:
   obtaining a model selection manner corresponding to the SRCC scan region, and determining a context index increment according to the model selection manner;
   selecting a context model corresponding to the coefficient part all zero flag according to the context index increment; and
   arithmetically decoding the coefficient part all zero flags based on the selected context model through a conventional decoding engine.

7. The video decoding method according to claim 6, wherein determining the context index increment comprises:
   setting the context index increment according to a shape of the SRCC scan region in response to the model selection manner being a first mode;
   setting the context index increment according to an area of the SRCC scan region in response to the model selection manner being a second mode; and
   setting the context index increment according to the preset first value in response to the model selection manner being a third mode.

8. The video decoding method according to claim 7, wherein setting the context index increment comprises:
   obtaining a region width and a region height of the SRCC scan region;
   setting an initial value of the context index increment according to a value relationship between the region width and the region height;
   setting an initial value increment of the context index increment according to a value ratio relationship between the region width and the region height; and
   setting the context index increment according to the initial value and the initial value increment.

9. The video decoding method according to claim 8, wherein setting the initial value of the contextual index increment comprises:

setting the initial value of the context index increment to the preset second value in response to a value of the region width being equal to a value of the region height;

setting the initial value of the context index increment to a preset third value in response to the region width being less than the region height; and setting the initial value of the context index increment to a preset fourth value in response to the region width being greater than the region height.

10. The video decoding method according to claim 8, wherein setting the initial value increment of the context index increment comprises:

calculating a value ratio between the larger one and the smaller one of the region width and the region height; and comparing the value ratio with a plurality of preset ratio thresholds and setting the initial value increment of the context index increment according to a result of the comparison.

11. The video decoding method according to claim 8, wherein setting the context index increment comprises:

setting the context index increment to the initial value in response to the value of the region width being equal to the value of the region height; and setting the context index increment to a sum of the initial value and the initial value increment in response to the value of the region width being not equal to the value of the region height.

12. The video decoding method according to claim 7, wherein setting the context index increment comprises:

obtaining a region width and a region height of the SRCC scan region;

determining a region area of the SRCC scan region according to the region width and the region height; and comparing the region area with a plurality of preset area thresholds and setting the context index increment according to a result of the comparison.

13. The video decoding method according to claim 1, further comprising:

determining whether a preset decoding skip condition is met; and skipping the operation of decoding the coefficient part all zero flag and setting the value of the coefficient part all zero flag to the preset second value, in response to the decoding skip condition being satisfied.

14. The video decoding method according to claim 13, wherein decoding the skip condition comprises at least one of:

the number of coefficients in the coefficient part is less than a preset number threshold; and an area proportion that the SRCC scan region accounts for in the coding block is less than a preset proportion threshold.

15. The video decoding method according to claim 1, wherein the particular coefficient part is located at a particular position in the SRCC scan region.

16. The video decoding method according to claim 15, wherein the particular coefficient part is a first coefficient part or a last coefficient part in the scan order.

17. The video decoding method according to claim 1, wherein the method is applied to a coding block satisfying a preset encoding condition, and the coding block satisfying the preset encoding condition includes:

a coding block in a transform skip mode;

a coding block with a picture-level intra prediction transform skip enable flag value of 1;

a coding block with a picture-level inter prediction transform skip enable flag value of 1; or a coding block with a picture-level intra prediction transform skip enable flag value of 1 and a picture-level inter prediction transform skip enable flag value of 1.

18. A video decoding apparatus, comprising: a memory storing computer program instructions; and a processor coupled to the memory and configured to execute the computer program instructions and perform:

segmenting to-be-decoded coefficients according to a scan order of a scan region-based coefficient coding (SRCC) scan region in a coding block of a video image frame to obtain one or more coefficient parts;

decoding a coefficient part all zero flag of each of the coefficient parts to obtain a value of the coefficient part all zero flag, the coefficient part all zero flag being used for indicating whether all coefficients in the coefficient part are zero;

decoding a significant flag of each coefficient in the coefficient part according to the scan order in response to the value of the coefficient part all zero flag being a preset first value, the significant flag being used for indicating whether the coefficient is a non-zero coefficient; and skipping decoding the significant flag and setting the significant flag of each coefficient in the coefficient part to zero, in response to the value of the coefficient part all zero flag being a preset second value.

19. The video decoding apparatus according to claim 18, wherein segmenting the to-be-decoded coefficients includes:

obtaining a coefficient part length, the coefficient part length being used for representing a maximum number of coefficients comprised in the coefficient part; and determining consecutive to-be-decoded coefficients according to the scan order of the SRCC scan region, and forming a number of coefficients equal to or less than the coefficient part length into one coefficient part.

20. A non-transitory computer-readable storage medium storing computer program instructions executable by at least one processor to perform:

segmenting to-be-decoded coefficients according to a scan order of a scan region-based coefficient coding (SRCC) scan region in a coding block of a video image frame to obtain one or more coefficient parts;

decoding a coefficient part all zero flag of each of the coefficient parts to obtain a value of the coefficient part all zero flag, the coefficient part all zero flag being used for indicating whether all coefficients in the coefficient part are zero;

decoding a significant flag of each coefficient in the coefficient part according to the scan order in response to the value of the coefficient part all zero flag being a preset first value, the significant flag being used for indicating whether the coefficient is a non-zero coefficient; and skipping decoding the significant flag and setting the significant flag of each coefficient in the coefficient part to zero, in response to the value of the coefficient part all zero flag being a preset second value.

\* \* \* \* \*